United States Patent

Wang

[11] Patent Number: 5,471,304
[45] Date of Patent: Nov. 28, 1995

[54] LASER POSITIONING METHOD AND APPARTUS FOR ROTARY ACTUATOR ARMS, AND THE LIKE

[76] Inventor: Charles P. Wang, 1180 Mahalo Pl., Compton, Calif. 90220

[21] Appl. No.: 214,986

[22] Filed: Mar. 21, 1904

[51] Int. Cl.⁶ ..................................................... G01B 9/02
[52] U.S. Cl. ........................... 356/358; 356/363; 356/349
[58] Field of Search .............................. 356/4.5, 5, 28.5, 356/28, 351, 357, 358, 363, 349

[56] References Cited

U.S. PATENT DOCUMENTS

| | | | |
|---|---|---|---|
| 3,409,375 | 11/1978 | Hubbard | 356/358 |
| 4,715,706 | 12/1987 | Wang | 356/5 |
| 4,920,442 | 4/1990 | Dimmick | 356/363 |
| 5,108,184 | 4/1992 | Brown et al. | 356/358 |
| 5,315,372 | 5/1994 | Tsai | 356/358 |

Primary Examiner—Samuel A. Turner
Assistant Examiner—Robert Kim

[57] ABSTRACT

A laser interferometer or a single aperture Laser Doppler Displacement Meter (LDDM) is used to measure the precise position of a ninety degree notch or a flat reflecting surface on a rotating arm. For the case of using the ninety degree notch, a stationary flat mirror is used to reflect back the laser beam which follows the same beam path but in the opposite direction to the receiving aperture. For the case of using a flat reflecting surface, a stationary corner cube and a stationary flat mirror are used to reflect back the laser beam which follows the same beam path but in the opposite direction all the way to the receiving aperture. For both cases, the laser beams remain aligned even though the arm rotates a large angle. Hence, the position of the rotating arm can be determined. Since the notch or flat reflecting surface is attached or integral part of the arm, the disk drive can be enclosed with the laser beam passing through a window. Hence, the technique described is non-intrusive.

11 Claims, 2 Drawing Sheets

LASER POSITIONING METHOD AND APPARTUS FOR ROTARY ACTUATOR ARMS, AND THE LIKE

BACKGROUND OF THE INVENTION

The invention relates generally to a non-intrusive and in situ laser position sensing method and apparatus and, in particular, to a method and apparatus for accurately locating the angular position of a rotary actuator arm of a disk drive, in which a small reflective notch is formed on the actuatar arm, or a flat reflecting surface is attached to or formed integral with the actuator arm.

The invention provides an improved technique for writing precision servo tracks on the recording medium of the disk drive without requiring the usual push-pin mechanism of the prior art, or the need to mount a heavy retro reflector on the rotary actuator arm.

The method and apparatus of the invention also have other applications such as the measurement of precise rotational angles, rotary encoders, the precise control of a rotary actuator, and angular positioning in conjunction with a laser interferometer.

Present day high capacity magnetic disk drives use, for example, 10,000 tpi (tracks per inch) or more, and optical disks often have ten times that track density. Reliable reading and writing of information on such closely-spaced tracks require precise read/write head positioning. Precise positioning systems require a position feedback signal from the disk drive. To provide such a feedback signal in a disk drive, tracks of position information are placed on the disk media by a servo-track writer in accordance with prior art procedures. For acceptable performance, only one percent of the total track spacing is usually allowed for the track writer position error. The small size of this allowable error, and the small size of the disk drives, make the non-intrusive and in situ laser positioning system of the present invention extremely important.

In general, a laser interferometer, such as described in Brown et al. Pat. No. 5,108,184, or a laser Doppler displacement meter (LDDM) such as described in Charles P. Wang Pat. No. 4,715,706, is used to measure the precision displacement of a target, which may be either a flat mirror or a corner cube mounted on the rotary actuator arm of the disk drive. The laser beam reflected from the target and returned to the receiver may be laterally displaced by a small amount, typically half the beam diameter, but the return beam should be parallel to the output beam within a few arc minutes. Prior art techniques require the attachment and subsequent removal of the corner cube from the rotary actuator arm. Therefore, in the prior art, the disk drive must be typically servo written before it is completely assembled. The presence of a relatively massive corner cube during servo writing affects the natural frequencies of the disk drive, and the subsequent removal of the corner cube and completion of the assembly of the disk drive after it has been servo written may cause distortions in the servo pattern and resulting track misregistration. Also, the use of mechanical linkage in the prior art, such as a push-pin, to determine the position of the actuator arm may significantly decrease the system accuracy and repeatability.

The Brown et al. Pat. No. 5,108,184 referred to above discloses a non-invasive laser positioning system for disk drive rotary actuator arms. A laser interferometer is used in the Brown et al. system to determine the angular position of a rotary actuator arm which has a fixed center of rotation, and which has a flat mirror mounted thereon. The laser beam reflected from the flat mirror on the actuator arm is intercepted by a fixed corner cube. The laser beam reflected by the corner cube, which is parallel to the incident beam, is reflected again by the flat mirror on the actuator arm toward the interferometer which receives the twice-reflected beam. Hence, the angular position of the actuator arm can be determined. However, as the flat mirror rotates in the Brown et al. system, the reflected beam also rotates at twice the angle of rotation of the flat mirror and the reflecting point also moves. Thus, in the Brown et al. system, the laser beam may miss the corner cube completely. Accordingly, proper operation of the Brown et al. system is possible only when the laser interferometer and the corner cube are mounted so that the corner cube is positioned at a convergence plane of the laser beams, and the carrier cub returns all reflected laser beams back to the flat mirror and hence to the interferometer. However, there are two main difficulties in the Brown et al. system, specifically, the convergence plane must be very close to the flat mirror on the actuatar arm, and a large laser beam diameter and a large area photo detector are required to allow for the large lateral movement of the return laser beam caused by the rotation of the flat mirror. These difficulties limit the application of the Brown et al. system insofar as servo writers are concerned.

It is accordingly an object of the present invention to provide a system and apparatus which serves to overcome the difficulties enunciated above.

SUMMARY OF THE INVENTION

The present invention provides a non-intrusive in situ laser positioning system to determine, for example, the angular position of a rotary actuator arm having a fixed center of rotation. Two embodiments of the invention will be described, the first employing a ninety degree notch reflector mounted on the actuator arm, and the second employing a flat reflector attached to or integral with the rotary actuator arm of the disk drive.

The apparatus of the invention in one embodiment uses a single aperture laser Doppler displacement meter (LDDM) in which both the output laser beam and the return beam share the same aperture. The LDDM may be of the type described, for example, in Wang Pat. No. 4,715,706 referred to above. The output laser beam has a small diameter, typically of the order 1 mm.

In the first embodiment, the laser beam is directed to a ninety degree notch reflector having two perpendicular polished flat reflecting surfaces and which is mounted on the actuator arm. The output laser beam is reflected from the two reflecting surfaces of the notch reflector toward a stationary flat mirror which is mounted adjacent to the LDDM. The stationary flat mirror is mounted perpendicular to the reflected beam from the notch reflector, and it reflects the laser beam back to the notch reflector along the same beam path as the incident beam but in the opposite direction. The reflected beam from the flat mirror is then reflected by the notch reflector back to the receiving aperture of the LDDM (which is also the output aperture) as a return beam along a path parallel to the output beam and displaced a small amount from the path of the output beam.

When the actuator arm is rotated to a different angle, the beam reflected by the notch reflector to the flat mirror will be displaced from but remain parallel to the previously reflected return beam. The incident beam will now be reflected back to the notch reflector by the flat mirror along the same path as the incident beam, and it will then be reflected by the notch reflector back to the receiving aperture of the LDDM displaced from but parallel to the output beam by a different displacement than in the previous case and, in this manner, the angular displacement of the actuator arm can be determined. The required accuracy of the notch reflector is determined by the alignment tolerance of the LDDM. Also, any deviation of the beam from ninety degrees can be compensated by adjusting the stationary flat mirror to be perpendicular to the incident laser beam.

The second embodiment of the invention utilizes the single-aperture LDDM which generates a laser beam of small diameter, a long flat polished reflecting surface mounted on the actuator arm, a relatively large stationary corner cube, and a long stationary flat mirror mounted adjacent to the LDDM. The LDDM directs its laser beam to the flat reflecting surface on the actuator arm, and that beam is reflected to the stationary corner cube which, in turn, reflects the beam back to the flat reflecting surface on the actuator arm. The reflected beam from the corner cube is parallel to but displaced from the incident laser beam, and it is reflected again by the flat reflecting surface on the actuator arm to the stationary flat mirror, the stationary flat mirror being mounted perpendicular to the output laser beam from the LDDM.

Since the reflected laser beam incident on the stationary flat mirror in the second embodiment is parallel to the output laser beam from the LDDM, the stationary flat mirror will reflect the incident beam along the same beam path but in the opposite direction to the output beam back to the receiving/emitting aperture of the LDDM. Accordingly, the output laser beam from the LDDM is first reflected by the flat reflecting surface on the actuator arm, is then reflected by the corner cube, then reflected by the flat reflecting surface of the actuator arm, then reflected by the stationary flat mirror, then reflected by the flat reflecting surface of the actuator arm, then reflected by the corner cube, and finally reflected by the flat reflecting surface of the actuator arm back to the emitting/receiving aperture of the LDDM. Hence, the position of the flat reflecting surface, and therefore the angular position of the actuator arm, can be determined.

When the actuator arm is rotated to a different angle, the laser beam reflected by the flat reflecting surface on the laser arm will be intercepted by the corner cube and reflected back to the receiving aperture along the paths described above. The required accuracy of the reflecting flat surface on the actuator arm is determined by the alignment tolerance of the LDDM.

As compared with the system described in the Brown et al. Pat. No. 5,108,184, the method and apparatus of the present invention, as described above, is more versatile. Specifically, there are no constraints in the system of the present invention on the location of the stationary corner cube, incident angle or geometry. Optimum geometry may be obtained for any particular geometry of a particular disk drive and actuator arm.

Both of the two embodiments of the invention described briefly above are based on the concept of using a single aperture LDDM laser head, or interferometer, and on the concept of a design for the optical system such that the laser beam is reflected back by a flat mirror tracing exactly the same beam path but in the opposite direction and finally returned to the emitting/receiving aperture of the LDDM laser head.

DETAILED DESCRIPTION OF THE PREFERRED EMBODIMENTS

The following description of the invention is made in the context of a servo track writing system for a rotating disk data storage device. It should be realized, however, that the teaching of the invention is not intended to be limited only to such an application or for use only with data storage systems, but has application in other systems as set forth above.

An important optical principle is recognized and utilized by the laser displacement measuring system of the invention, in one of its aspects, and that is the use of a single aperture laser head which uses the same aperture for emitting and receiving the laser beam, and subsequently reflecting the laser beam by a ninety degree reflective notch used in the first embodiment of the invention, or by a flat reflecting surface and a corner cube used in the second embodiment. In both embodiments, a flat mirror is used to the reflect the laser beam parallel to the incident laser beam but in the opposite direction, so that the reflected laser beam may follow a beam path all the way back to the emitting/receiving aperture of the single aperture laser head.

Figure 1:
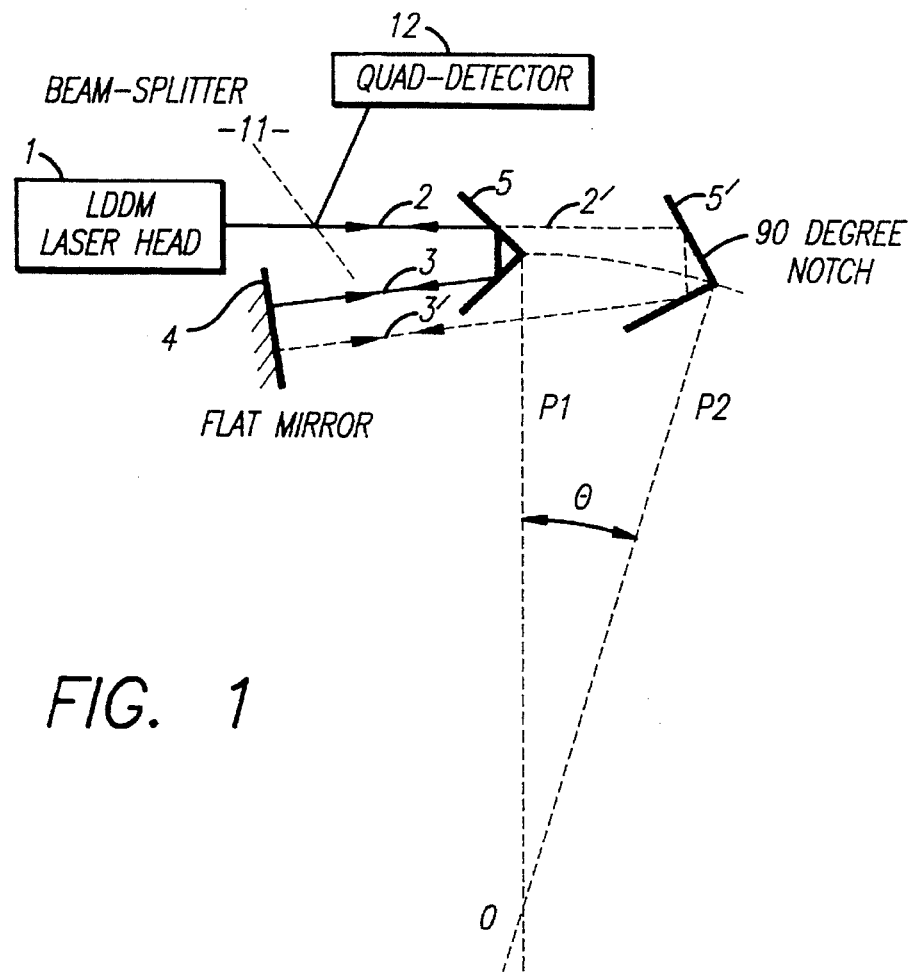
FIG. 1 is a schematic diagram showing the components of a position measuring system constructed in accordance with a first embodiment of the invention.

The first embodiment of the invention is shown in FIG. 1, in which a single aperture LDDM 1 provides an output beam 2 which is directed to a ninety degree reflector notch 5, the reflector notch being mounted on a rotary actuator arm of a disk drive having a center of rotation at 0. The reflected beam 3 from the notch reflector 5 is reflected by a flat mirror 4, the flat mirror 4 being mounted perpendicular to the incident beam. The reflected beam 3 is parallel but in the opposite direction to the incident beam 3 from the notch reflector. The reflected beam 3 is again reflected by the notch 5 to be parallel to the output beam 2 but in the opposite direction, and finally to enter the emitting/receiving aperture of LDDM 1.

Hence, in the system of FIG. 1, the position of the reflector notch 5, and thus of the rotary actuator on which it is mounted, may be determined.

Rotating the actuator arm from position P1 to position P2 will cause the reflector notch (now designated 5') to assume the position P2. The laser beam 2' from the LDDM will be reflected by the reflector notch 5' to the flat mirror 4. The reflected beam 3' is parallel to beam 3 and perpendicular to the flat mirror 4. Therefore, the reflected beam 3' is reflected by the flat mirror 4 along the same path as the path of the incident beam 3' but in the opposite direction. Reflected beam 2' retraces the same path as described above, and finally enters the emitting/receiving aperture of the LDDM 1.

It should be noted that, for easy fabrication, the reflector notch 5 does not have to be exactly ninety degrees, but may be a few degrees larger or smaller. Hence, for different notch angles, the beam 3 may not be perpendicular to the flat mirror 4, and the system then becomes out of alignment. To automatically align the flat mirror 4 to be perpendicular to the beam 3 at all times, a beam splitter 11 may be placed in the path of the output beam 2, and part of the reflected beam 2 may be directed to a quad detector 12. If the reflected beam 2 is not parallel to the emitted beam 2, the quad detector will send an error signal to servo motors contained in, a two-axis servo control system. The servo motors are mechanically coupled to the flat mirror 4 and serve to rotate the flat mirror 4 until the return beam is parallel to the emitted beam 2 as it enters the emitting/receiving aperture of the LDDM 1.

Figure 2:
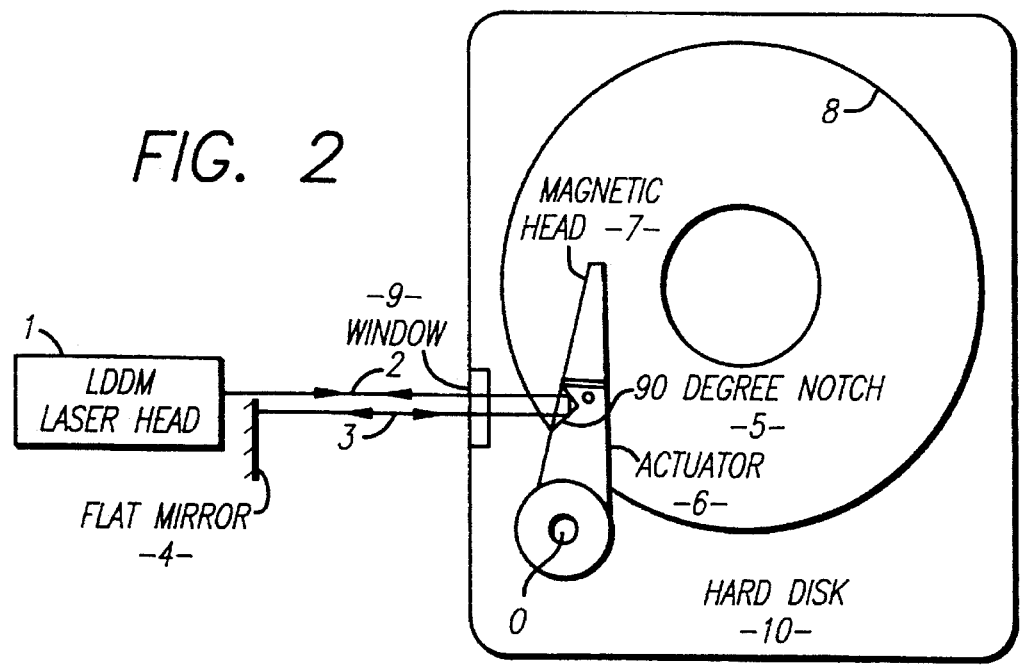
FIG. 2 shows a simplified top view of a disk drive to be servo written in conjunction with the rotary actuator position measuring system of the first embodiment of the invention shown in FIG. 1.

FIG. 2 is a typical setup for a non-intrusive servo track writing system based on the first embodiment described above in conjunction with FIG. 1. In FIG. 2, the LDDM 1 provides the output beam 2, and the output beam passes through a glass or plastic window 9 to the ninety degree reflective notch 5 mounted on the rotary arm 6. The disk drive consists of a conventional disk media 8, the rotary actuator arm 6, and a magnetic head 7 mounted at the distal end of the rotary actuator. The apparatus of FIG. 2 operates in the manner described above in conjunction with FIG. 1.

Figure 3:
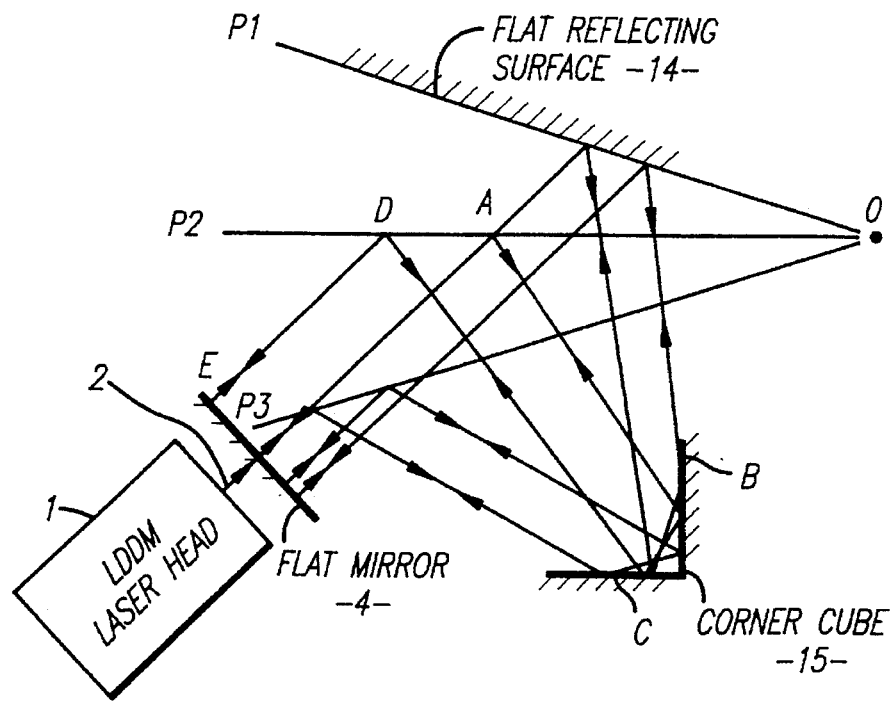
FIG. 3 is a schematic diagram showing the components of a position measuring system constructed in accordance with a second embodiment of the invention.

The second embodiment of the invention is shown in FIG. 3, and it utilizes a long, flat reflecting surface 14 formed on the actuator arm 6, instead of the ninety degree notch reflector 5 of the first embodiment of FIGS. 1 and 2. As shown in FIG. 3, the LDDM laser head 1 provides an output beam 2 and directs the output beam to a point A on the flat reflecting surface 14 of the actuating arm at a position P2. The reflected beam from point A is directed to point B on one reflecting surface of a retro-reflector corner cube 6. The reflected beam is then reflected to point C on the second reflecting surface of the corner cube 15, and then to point D on the reflector surface 14. The beam is then reflected from point D on the reflector surface 14 to point E on the flat mirror 4.

If the flat mirror 4 is aligned to be perpendicular to the incident beam from point E, the reflected beam will reach point D, point C, point B, point A and finally enter the laser head receiving/emitting aperture. Hence, the angular position of the flat reflector surface 14 and, thus the angular position of the rotary actuator arm on which it is mounted, can be determined. The incident beam on the corner cube 15 and the corresponding reflected beam are always parallel. Therefore, when the actuator arm and the flat reflecting surface 14 mounted thereon are rotated to positions P1 or P3, the beams reflected from the corner cube 15 and the flat reflecting surface 14 are all parallel to the output laser beam 2. Therefore, all the reflected beams enter the emitting/receiving aperture of LDDM 1.

It is to be noted that the center of rotation of the actuator arm does not have to be along the plane of the surface of the flat reflecting surface 14, but may be a distance from the surface. Also, the size and location of the corner cube 15 are determined by the incident angle of the laser beam and maximum rotational angle of the actuator arm. The corner cube 15 and the flat mirror 4 should be large enough to cover all reflected beams. For practical purposes, it is more convenient to permit laser beam 2 to be tilted a small angle in a direction perpendicular to the drawing, so that all reflected beams will meet the flat mirror 4 (for example, point E) above or below the output laser beam 2. Then, the flat mirror 4 can be placed just above or just below the output laser beam 2.

Figure 4:
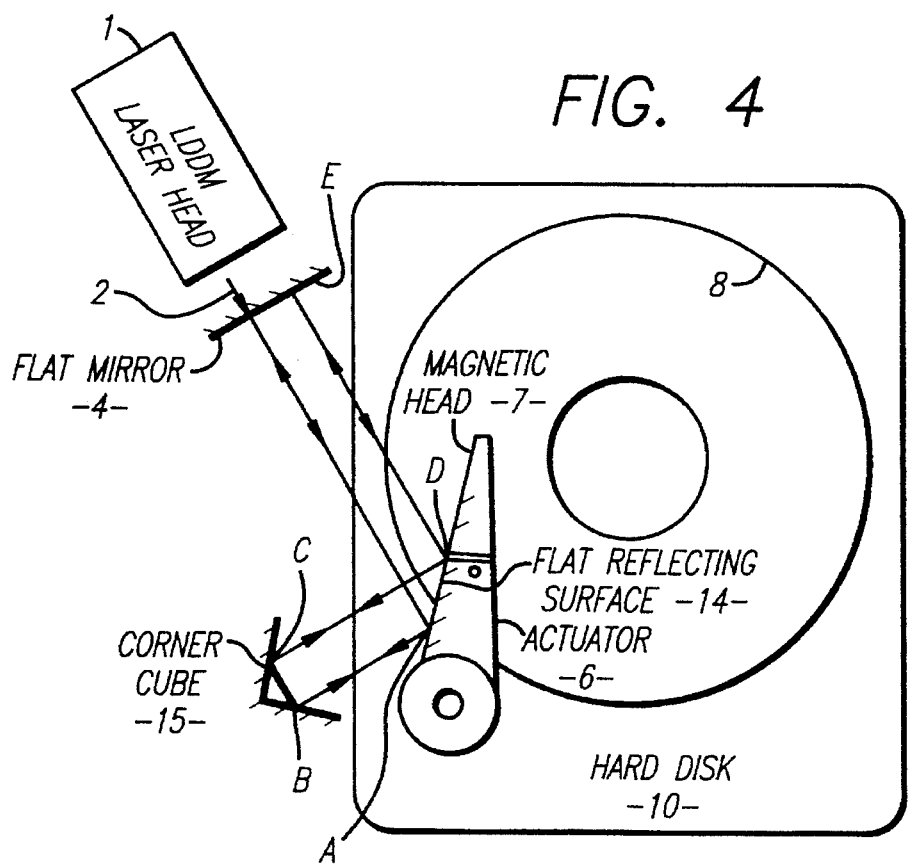
FIG. 4 shows a simplified top view of a disk drive to be serve written in conjunction with the rotary actuator position measuring system of the second embodiment of the invention shown in FIG. 3.

FIG. 4 is a representation of typical apparatus for non-intrusive servo track writing based on the second embodiment of the invention. The LDDM laser head 1 provides an output beam 2 which is directed to the flat reflecting surface 14 mounted on the actuator arm 6. The reflected beam is intercepted by corner cube 15 which reflects the beam back to the flat reflecting surface 14 along a path parallel to but displaced from the path of the incident beam 2. The reflected beam is reflected again by the flat reflecting surface 14 to flat mirror 4. Since the flat mirror is perpendicular to the incident beam, the reflected beam will be parallel to the incident beam but in the opposite direction. Accordingly, the reflected beam will trace the same beam path as the incident beam but in the opposite direction back to the receiving/emitting aperture of LDDM 1. As shown in FIG. 4, the disk drive 10 consists of a magnetic disk 8, actuator arm 6 and magnetic head 7.

The invention provides, therefore, an improved non-intrusive and in situ laser positioning sensing method and apparatus for accurately locating the angular position of a rotary actuator arm of a disk drive, and for other related purposes. The apparatus of the invention has a small notch or flat reflecting surface attached to the actuator arm which, in conjunction with other elements, forms the improved apparatus of the invention.

It will be appreciated that while particular embodiments of the invention have been shown and described, modifications may be made. It is intended in the following claims to cover all such modifications which fall within the true spirit and scope of the invention.

I claim:

1. Apparatus for determining the angular position of a body about a fixed axis of rotation, said apparatus comprising: reflecting means mounted on said body; a stationary flat mirror mounted at a position displaced from said body; laser means for producing a laser output beam and for directing said output beam to said reflecting means, said reflecting means reflecting said output beam as a first reflected beam and for directing said first reflected beam to said flat mirror along a path perpendicular to said flat mirror, said flat mirror being positioned to reflect said first reflected beam back to said reflecting means as a second reflected beam along the same path as said first reflected beam but in the opposite direction, and said reflecting means reflecting said second reflected beam back to said laser means along a path parallel to the path of said output beam but in the opposite direction as a return beam displaced from said output beam to enable said laser means to determine the angular position of said body with respect to said fixed axis of rotation.

2. The apparatus defined in claim 1, in which said laser means comprises a single aperture laser Doppler displacement meter.

3. The apparatus defined in claim 1, in which said laser means includes an interferometer.

4. The apparatus defined in claim 1, in which said body comprises a rotary actuator arm.

5. The apparatus defined in claim 4, in which said reflecting means comprises a ninety degree notch formed on said actuator arm having two flat reflecting surfaces positioned at ninety degrees to one another.

6. The apparatus defined in claim 4, in which said reflecting means comprises a flat reflecting surface formed on said actuator arm, and in which said first reflecting means also includes stationary retro reflecting optical means mounted at a position displaced from said actuator arm.

7. The apparatus defined in claim 6, in which said retro reflecting optical means is in the form of a corner cube.

8. The apparatus defined in claim 4, in which said rotary actuator arm is included in a data storage unit having rotating magnetic recording media, and further having at least one read/write magnetic head mounted on said actuator arm for reading.

9. The apparatus defined in claim 1, and which includes control means including a quad detector optically coupled to said return beam mechanically coupled to said flat mirror for controlling the angular position of said flat mirror, and beam splitting means positioned in the path of said return beam to direct part of the return beam to said quad detector to cause said control means to control the angular positions of said flat mirror so as to maintain said return beam parallel to said output beam.

10. The apparatus defined in claim 6, in which the plane of said flat reflecting surface is offset from the plane of the center of rotation of said rotary actuator arm.

11. A method for determining the angular position of a body having a fixed axis of rotation comprising the steps of: producing a laser output beam and directing the output beam to a reflecting means mounted on said body to cause said reflecting means to reflect said output beam as a first reflected beam and directing said first reflected beam perpendicularly to a stationary flat mirror displaced from the body to cause the flat mirror to reflect the first reflected beam back to the first reflecting means as a second reflected beam along the same path as the first reflected beam but in the opposite direction to cause the reflecting means to reflect the second reflected beam back to the source of the laser output beam as a return beam along a path parallel to the path of the output beam but in the opposite direction and displaced from the output beam to enable a determination to be made as to the angular position of said body with respect to said fixed axis of rotation.

* * * * *

UNITED STATES PATENT AND TRADEMARK OFFICE
CERTIFICATE OF CORRECTION

Page 1 of 1

| | |
|---|---|
| PATENT NO. | : 5,471,304 |
| APPLICATION NO. | : 08/214986 |
| DATED | : November 28, 1995 |
| INVENTOR(S) | : Charles P. Wang |

It is certified that error appears in the above-identified patent and that said Letters Patent is hereby corrected as shown below:

Title page

Item 22 – Filed

"March 21, 1904" - should read "March 21, 1994"

Signed and Sealed this
Twenty-fourth Day of July, 2012

David J. Kappos
*Director of the United States Patent and Trademark Office*